United States Patent

Ogawa

[11] 4,386,300
[45] May 31, 1983

[54] APPARATUS FOR REPRODUCING DISC RECORD

[75] Inventor: Hiroshi Ogawa, Tokyo, Japan

[73] Assignee: Sony Corporation, Tokyo, Japan

[21] Appl. No.: 204,552

[22] Filed: Nov. 6, 1980

[30] Foreign Application Priority Data

Nov. 15, 1979 [JP] Japan ............... 54-148093

[51] Int. Cl.³ .................................. H02P 5/06
[52] U.S. Cl. .................... 318/314; 318/329; 318/617
[58] Field of Search ........... 318/310, 313, 314, 329, 318/341, 342, 616, 617

[56] References Cited

U.S. PATENT DOCUMENTS

| | | | |
|---|---|---|---|
| 3,986,089 | 10/1976 | Sword et al. | 318/313 X |
| 4,079,942 | 3/1978 | Kunen | 318/313 X |
| 4,227,133 | 10/1980 | Imamura | 318/313 X |
| 4,232,257 | 11/1980 | Harshberger, Jr. | 318/313 X |
| 4,280,082 | 7/1981 | Acharya et al. | 318/310 X |
| 4,301,395 | 11/1981 | Furuhata et al. | 318/314 |

FOREIGN PATENT DOCUMENTS 442456 7/1975 U.S.S.R. ............... 318/310

Primary Examiner—J. V. Truhe
Assistant Examiner—Richard M. Moose
Attorney, Agent, or Firm—Hill, Van Santen, Steadman, Chiara & Simpson

[57] ABSTRACT

Apparatus for maintaining a constant linear velocity for a PCM disc record which includes a detector for optically detecting the PCM signal on the record and supplies the output to a differentiating circuit and a rectifier circuit with the output of the rectifier circuit supplied to a peak detector circuit which supplies its output to a level comparator that also receives a reference level from a reference source. A first phase comparator also receives the output of the rectifier circuit and controls a voltage controlled oscillator through a low pass filter and the output of the voltage controlled oscillator is supplied to the phase comparator. A divider receives the output of the voltage controlled oscillator and supplies a first input to a phase comparator which also receives an input from a reference frequency generator. The outputs of the level comparator and the phase comparator are supplied to the motor drive circuit which controls the drive motor for the disc record.

3 Claims, 10 Drawing Figures

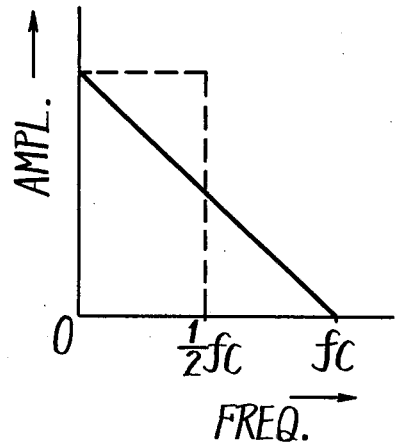
FIG. 1
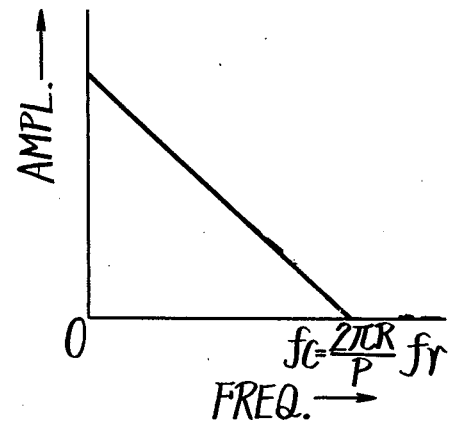
FIG. 4
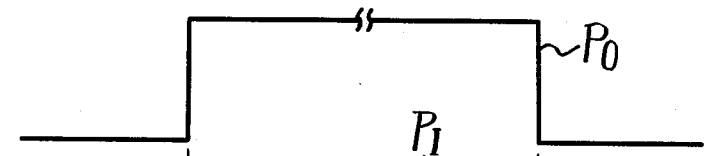
FIG. 3A
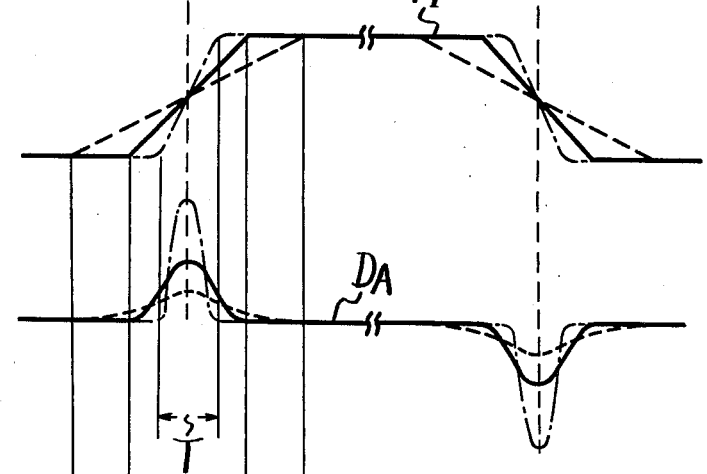
FIG. 3B
FIG. 3C

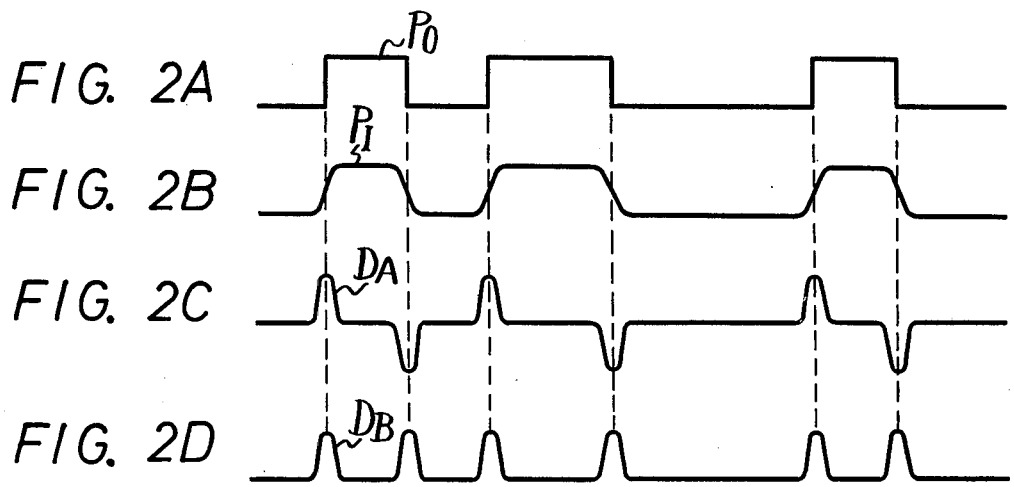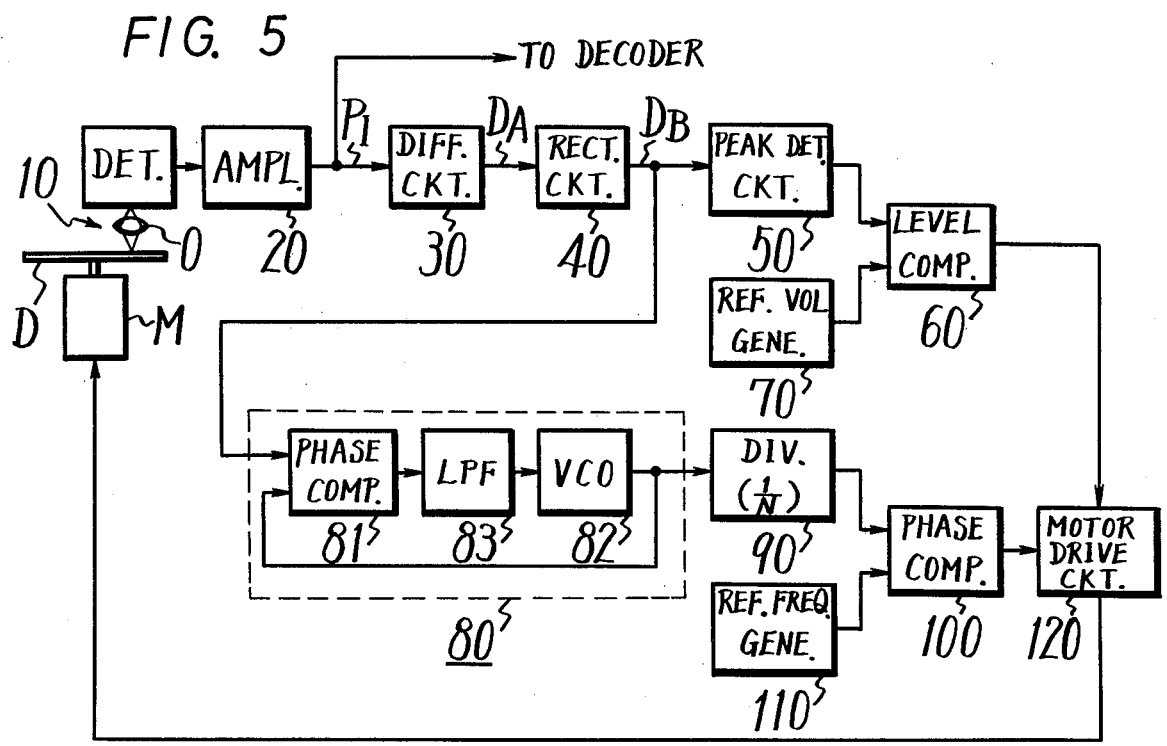

APPARATUS FOR REPRODUCING DISC RECORD

BACKGROUND OF THE INVENTION

1. Field of the Invention

The present invention relates generally to a servo control system for a disc record reproducing apparatus, and more particularly to a servo control system for an apparatus suitable to optically reproduce a PCM (pulse code modulation) signal recorded on a disc record.

2. Description of the Prior Art

In the art, when a PCM signal is recorded on a disc record, there are two methods one of which uses a constant angular velocity of the disc record and the other uses a constant line velocity of the disc record. In the case of the constant line velocity recording, its recording density is greatly improved as compared with that in the case of the constant angular velocity recording, but in the case of the constant line velocity recording it is necessary to reproduce the disc record with its line velocity being constant, which makes it difficult to control the rotation of the disc record during reproduction.

In the case of a video disc record, the rotation control thereof is carried out in such a manner that a reproduced signal is demodulated to provide a composite video signal, the synchronizing signal is then separated from the composite video signal, and the frequency of the synchronizing signal is maintained constant.

In the case of a PCM audio signal wherein the base band is recorded, which is generally a binary signal, the above method can not be employed. If the PCM audio signal is not recorded as the base band recording, but is recorded after it is converted into a quase or pesudo video signal containing a sychronizing signal, the method which is same as that used in the case of the video disc record can be employed. However, in this case the recording density is lowered which will cancel the advantages of the constant line velocity recording.

On the other, such a method may be considered that the position of a pick up device in the radius direction of a disc record is detected by using a mechanical position detecting means, the rotation of the disc record is controlled by the detected output, a clock component is extracted from a reproduced signal under the above conditions, and the extracted component is used as a comparing signal to further control the rotation of the disc record. However, the employment of such mechanical position detecting means results in greatly increased cost of the apparatus.

OBJECT AND SUMMARY OF THE INVENTION

Accordingly, an object of the present invention is to provide a novel servo control system for a disc record reproducing apparatus which is free from the defects of the prior art.

Another object of the invention is to provide a servo control system for a disc record reproducing apparatus in which a disc record recorded at a constant line velocity is rotated at a constant line velocity without using any complicated circuit construction during reproduction.

A further object of the invention is to provide a servo control system for a disc record reproducing apparatus in which since the signal recorded on a disc record is used as a control signal for a servo system, and the servo control can be carried out precisely.

A further object of the invention is to provide a servo control system for a disc record reproducing apparatus in which when a disc record having recorded thereon a PCM signal is reproduced by an optical means, the fact that the optical system has a low pass filter characteristic and that the peak value of a differentiated reproduced PCM signal is in proportional to the line velocity of the disc record are taken into consideration to control the rotational speed of the disc record.

A still further object of the invention is to provide a servo control system for a disc record reproducing apparatus with which the rotation control and position control of a disc record can be performed by a simple servo construction.

According to an aspect of the present invention a servo control system for a disc record reproducing apparatus having a motor and a disc record to be rotated by said motor and on which a PCM signal is recorded with constant line velocity, the servo control system of which comprises:

(a) a detecting head optically coupled to said record disc for reproducing a recorded PCM signal;

(b) a differential circuit coupled to said detecting head for differentiating the reproduced PCM signal;

(c) a detecting circuit for peak detecting the differential signal derived from said differential circuit;

(d) a comparator for comparing the peak level of an output signal derived from said detecting circuit with a reference voltage in order to produce a control signal; and (e) a motor drive circuit supplied with said control signal for controlling said motor so as to rotate the disc record at a constant line velocity during reproduction.

The other objects, features and advantages of the present invention will become apparent from the following description taken in conjunction with the accompanying drawings.

BRIEF DESCRIPTION OF THE DRAWINGS

FIG. 1 is a graph showing the characteristic of a low pass filter;

FIGS. 2A to 2D are waveform diagrams respectively showing PCM signals reproduced by an optical device;

FIGS. 3A to 3C are waveform diagrams respectively showing in an enlarged scale the reproduced PCM signal;

FIG. 4 is a graph showing the frequency characteristic of an optical system; and FIG. 5 is a block diagram showing an example of the servo control system for a disc record reproducing apparatus according to the present invention.

DESCRIPTION OF THE PREFERRED EMBODIMENT

The present invention will be hereinafter described with reference to the attached drawings.

First, a low pass filter having the characteristic shown in the graph of FIG. 1 will be considered. In the graph of FIG. 1, the broken line represents an ideal characteristic of a low pass filter while the solid line represents a so-called 100% roll-off characteristic of a low pass filter.

When a PCM signal $P_O$ having a sharp edge as shown in FIG. 2A is supplied to a low pass filter with the above latter-mentioned characteristic, an output PCM signal $P_I$ from the low pass filter will have rising-up and falling-down edges which have become dulled as shown in FIG. 2B. In this case, such a low pass filter must have cut-off frequency $f_c$ which is free from code interference.

FIGS. 3A and 3B respectively show in an enlarged scale the rising-up and falling-down edges or portions of the signals $P_O$ and $P_I$ shown in FIGS. 2A and 2B. In practice, the characteristic or waveform shown in FIG. 3B is time-delayed by the low pass filter from the signal or pulse signal shown in FIG. 3A, but they are shown with no time delay for the sake of comparison in FIGS. 3A and 3B.

In this case, a time period T within which the PCM signal $P_I$ will rise up and then fall down is expressed by the reciprocal of a frequency where 6 dB down is generated in the case of 100% roll-off. In the case of the low pass filter with the characteristic shown in FIG. 1, the time period T is expressed as follows;

$$T = (2/f_c) \quad (1)$$

Thus, as the cut-off frequency $f_c$ becomes higher, the time period T becomes shorter as shown in FIG. 3B by the broken line, solid line and one-dot chain line, respectively.

When the PCM signal $P_I$ is differentiated, as shown in FIG. 3C, the peak value of its differentiated signal $D_A$ has a height which is inversely proportional to the time period T within which the PCM signal $P_I$ rises up and then falls down, namely the cut-off frequency $f_c$ of the low pass filter.

In general, in case of reading out an optical disc record, its information density is determined by the open area ratio N of an objective lens used and the wave length $\lambda$ of a laser beam which is used. In general, the MTF (modulation transfer function) is defined on a black and white pattern, but this is similarly applied to the releaf structure of concave and convex. The cut-off space frequency 1/P thereof is given as follows:

$$\frac{1}{P} = \frac{2N}{\lambda} \quad (2)$$

The relation between the cut-off space frequency 1/P and the cut-off frequency $f_c$ of electrical signal is given as follows:

$$f_c = \frac{2\pi R \cdot f_r}{P} = \frac{2N}{\lambda} (2\pi R \cdot f_r) = \frac{2N}{\lambda} V \quad (3)$$

where R is the radius of a track on the optical disc record and $f_r$ is the rotational speed of the disc record per second so that V is the line velocity of the disc record. Based upon the above, the normalized frequency characteristic becomes substantially as shown in the graph of FIG. 4.

That is, the above optical system has a characteristic which is the same as that of the low pass filter having the characteristic shown in the graph of FIG. 1 and its photo-detector reproduces a PCM signal which is the same as the PCM signal $P_I$ which is the output from the above low pass filter and whose cut-off frequency $f_c$ is proportional to the line velocity V. Accordingly, the time period T of rising-up or falling-down of the reproduced PCM signal $P_I$ is expressed as follows:

$$T = \frac{2}{f_c} = \frac{\lambda}{N} \cdot \frac{1}{V} \quad (4)$$

That is, the time period T is inversely proportional to the line velocity V.

Now, such a case where a signal is recorded with the highest frequency of 1.189512 $MH_z$ and a 3 PM system will be considered by way of example. In this case, the following is assumed:

N=0.4
$\lambda$=6328 A=0.6328×10$^{-6}$ m

When the rotational speed $f_r$ of a disc with a diameter of 30 cm is 7.5 rps (32 450 rpm), the cut-off frequency $f_c$ at the inner most R=0.055 m of the disc is 3.3 $MH_z$ and the time period T is 600 n sec, while when the rotational speed $f_r$ is 15 rps (=900 rpm), the cut-off frequency $f_c$ is 6.6 $MH_z$ and the time period T is 300 n sec.

When the reproduced PCM signal $P_I$ is differentiated, since the peak value of its differentiated signal $D_A$ is inversely proportional to the time period T of the rising-up or falling-down of the reproduced PCM signal $P_I$ as described previously, the peak value of the differentiated signal $D_A$ is proportional to the line velocity V.

The present invention notes the above fact and carries out the following process and control. That is, the reproduced PCM signal is differentiated, the peak value of the differentiated PCM signal is detected, the detected voltage is compared with a reference voltage and the rotational speed of a disc record is controlled by the compared output.

Turning to FIG. 5 which illustrates in block an example of the servo control system for a disc record reproducing apparatus according to the present invention, the invention will be described. In the example of FIG. 5, a disc record D is rotated by a motor M and a PCM signal recorded on the disc record D is reproduced by a photo-detector 10 which includes a laser light source and an optical system O. A PCM signal $P_I$ reproduced by the photo-detector 10 is supplied through an amplifier 20 to a decoder to be converted to a sound signal. Since the decoder used in the invention is well known in the art, it is not shown in FIG. 5 and its detailed description will be omitted. The reproduced PCM signal $P_I$ has a characteristic such that the time period T of rising up or falling-down is inversely proportional to the line velocity V of the disc record D during reproduction as set forth above (see FIG. 2A).

The reproduced PCM signal $P_I$ passed through the amplifier 20 is fed to a differential or differentiation circuit 30 and therein differentiated to form a differential or differentiated signal $D_A$ (see FIG. 2C). This differentiated signal $D_A$ therefrom is applied to a rectifying circuit 40 and full-wave-rectified thereby to form a full-wave-rectified signal $D_B$ (see FIG. 2D). The peak value of the differentiated signal $D_A$ and hence the rectified differentiated signal $D_B$ is proportional to the line velocity V of the disc record D during reproduction as described previously.

The rectified differentiated signal $D_B$ is applied to a peak detecting circuit 50 which then detects its peak value and supplies the detected voltage to one of the input terminals of a level comparator 60. A reference voltage generating circuit 70 is provided to produce a reference voltage which will set a desired line velocity of the disc record D during reproduction. The reference voltage from the reference voltage generating circuit 70 is applied to the other input terminal of the level comparator 60. The voltage from the level comparator 60, which corresponds to the difference between the detected peak voltage and the reference voltage, is supplied to a motor drive circuit 120 to drive the motor M's. Thus, the motor M rotational speed is controlled by the output from the motor drive circuit 120.

Accordingly, the rotational speed of the disc record D is so controlled that the peak value of the differentiated signal $D_B$ is always equal to the reference voltage or the time period T the rising up or falling-down of the reproduced PCM signal $P_I$ is always constant, and the line velocity of the disc record D during reproduction becomes constant at respective values corresponding to the line velocity during recording.

In practice, in order to further increase the accuracy of the control, another system is provided. That is, the differentiated signal $D_B$, whose peak value is made constant as set forth above, from the rectifying circuit 40 is supplied to a PLL (phase locked loop) circuit 80 which will produce a bit clock. This PLL circuit 80 is formed of a phase comparator 81, a voltage controlled oscillator 82 and a low pass filter 83 connected as shown. The output clock from the PLL circuit 80 is fed to a frequency divider 90 and frequency-divided thereby by N to obtain a frequency suitable for driving the motor M. The frequency-divided signal therefrom is applied to one of the input terminals of a phase comparator 100. A reference frequency signal generating circuit 110 is also provided which produces a signal having the frequency which is 1/N times the normal clock frequency. This reference frequency signal from the reference frequency signal generating circuit 110 is applied to the other input terminal of the phase comparator 100. The compared output from the phase comparator 100 is supplied to the motor drive circuit 120 for controlling, the rotary position and speed of the motor M.

Thus, the rotation of the disc record D is so controlled that the frequency of the clock components in the reproduced PCM signal becomes the normal clock frequency.

In this example of the invention it may be possible that the motor M and hence disc record D are simultaneously controlled by both the outputs from the level comparator 60 and the phase comparator 100, or switching is possible such that the rotational speed of the disc record D is controlled first by the output from the level comparator 60 such that the line velocity of the rotation of the disc record D becomes substantially constant and thereafter the disc record D is controlled by the output from the phase comparator 100.

As described above, according to the present invention, a disc record, on which a PCM signal is recorded under the condition that the disc is rotated so that its line velocity is constant, can be reproduced while the disc record is rotated at the constant line velocity by apparatus having a simple construction.

It will be apparent that many modifications and variations could be effected by one skilled in the art without departing from the spirits or scope of the novel concepts of the present invention, so that the spirits or scope of the invention should be determined by the appended claims only.

I claim as my invention:

1. A servo control system for a disc record reproducing apparatus comprising a motor for driving a disc record so that a PCM signal recordable on the record with constant line velocity, a servo control system for said motor comprising a detector means which is optically coupled to said record disc and detects said recorded PCM signal, a differentiating circuit receiving the output of said detector, a peak detector circuit receiving the output of said differential circuit, a reference amplitude generator, a level comparator receiving inputs from said reference level generator and said peak detector circuit, a first phase comparator receiving the output of said rectifier circuit, a voltage control oscillator receiving the output from said first phase comparator and supplying an input to said first phase comparator, a second phase comparator receiving the output of said voltage control oscillator, a reference frequency generator supplying an input to said second phase comparator and a motor drive circuit receiving inputs from said level comparator and said phase comparator and supplying an input to control the speed of said drive motor for said disc.

2. An apparatus according to claim 1 comprising a rectifier circuit connected between said differentiating circuit and said peak detector circuit and said first phase comparator circuit.

3. An apparatus according to claim 1 including a divider connected between the output of the voltage control oscillator and said second phase comparator.

* * * * *